No. 728,387. PATENTED MAY 19, 1903.
F. C. FOOS & T. G. MUIR.
VENTILATOR.
APPLICATION FILED JULY 23, 1902.
NO MODEL.
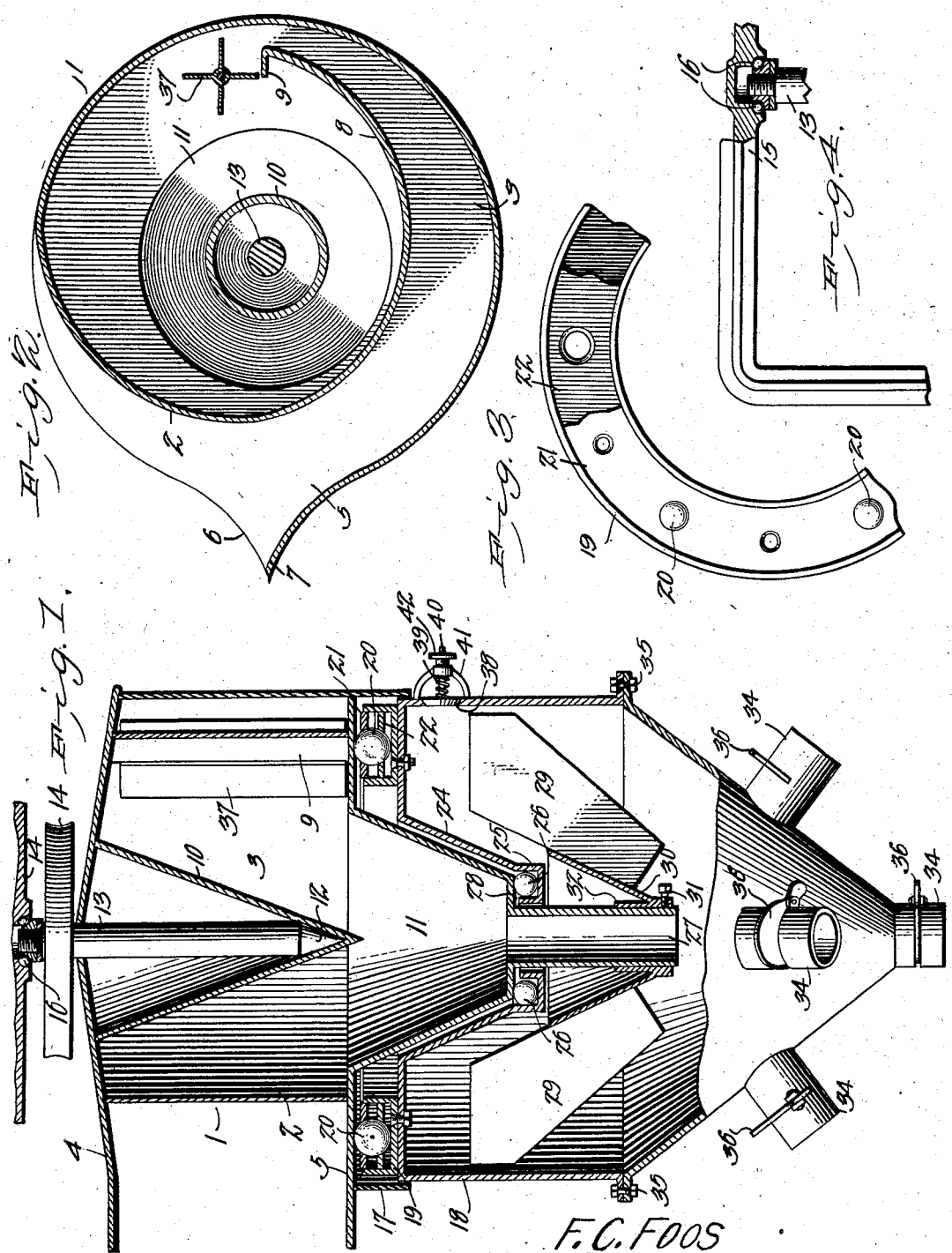
F. C. FOOS
T. G. MUIR, Inventors No. 728,387. Patented May 19, 1903.

UNITED STATES PATENT OFFICE.

FLORENCE CARRICO FOOS AND THOMAS G. MUIR, OF WASHINGTON, DISTRICT OF COLUMBIA.

VENTILATOR.

SPECIFICATION forming part of Letters Patent No. 728,387, dated May 19, 1903.

Application filed July 23, 1902. Serial No. 116,684. (No model.)

*To all whom it may concern:*

Be it known that we, FLORENCE CARRICO FOOS and THOMAS G. MUIR, citizens of the United States, residing at Washington, in the District of Columbia, have invented a new and useful Ventilator, of which the following is a specification.

The invention relates to improvements in ventilators.

The object of the present invention is to simplify and improve the construction of ventilators and to provide an efficient one designed to be applied to buildings, ships, mines, and various other places where it is desirable to provide a continuous supply of fresh air and capable of producing a constant draft through such places and of enabling the supply of air to be controlled.

The invention consists in the construction and novel combination and arrangement of parts hereinafter fully described, illustrated in the accompanying drawings, and pointed out in the claims hereto appended.

In the drawings, Figure 1 is a vertical sectional view of a ventilator constructed in accordance with this invention. Fig. 2 is a horizontal sectional view of the upper portion of the ventilator. Fig. 3 is a detail view illustrating the manner of mounting the upper series of antifriction devices. Fig. 4 is a detail view illustrating the manner of supporting and bracing the shaft of the rotary casing.

Like numerals of reference designate corresponding parts in all the figures of the drawings.

1 designates an upper rotary casing of approximately cylindrical form having an approximately spirally arranged wall 2, forming an inwardly-converging approximately circumferential air-passage 3, extending around the casing approximately one-half the length of the same and adapted when the casing is rotated to collect the air and force the same through the passage 3, and the force of the air is increased by the inwardly-tapering passage. Any desired force of air through the circumferential passage 3 may be obtained by rotating the casing, as hereinafter explained, and the air entering the casing will be carried downward through the ventilator, as hereinafter explained, to be delivered to different portions of the building, ship, mine, or other place ventilated. The spiral wall is connected by a top 4 and a bottom 5, which are extended outward and tapered at 6, as clearly shown in Fig. 2, to provide a support for the outer end 7 of the spiral wall, which is curved outward to produce a wide flaring mouth or entrance to the passage. The inner portion or partition 8 of the spiral wall is spaced from the outer portion and terminates at its inner end with a flange 9, extending inward and located at the inner constricted end of the eccentrically-arranged passage 3. The inner chamber or space inclosed by the spiral wall is also eccentrically arranged, as clearly shown in Fig. 2, and is adapted to cause an agitation of the air and at the same time prevent the ventilator from becoming choked, as might be the case were the chamber centrally arranged. Within the rotary casing is arranged a depending hollow cone 10, extending downward from the top of the casing and adapted to direct the air downward through a hollow depending tubular portion 11, and the said cone, which may be constructed in any desired manner, is preferably arranged, as shown in Fig. 1, to form a support for the lower tapered end 12 of a shaft 13, which is fixed to the rotary casing and which has keyed or otherwise secured to its upper end a grooved pulley 14, which is designed to be connected by a belt with any suitable motive power for rotating the upper casing. The upper end of the shaft 13 is preferably extended above the pulley 14 and is supported by a suitable bracket 15, having ball-bearings 16; but any other suitable antifriction device may be substituted for the balls, as will be readily understood.

The rotary casing is provided at its bottom with a depending annular flange or guard 17, receiving the upper portion of a lower stationary casing 18, which is designed to be fixed in any suitable manner to the structure to be ventilated and which is provided within the flange 17 with an annular ball-race 19, consisting of a trough secured to the top of the casing, as clearly shown in Fig. 1; but the ball-race may be constructed in any other suitable manner, and antifriction devices may be employed for supporting the upper rotary casing. The antifriction-balls 20, which may consist of a continuous series, are preferably spaced apart and arranged within a supporting-frame consisting of upper and lower rings 21 and 22 and connecting rods or pieces 23. The ball-race may be filled with a suitable lubricant, and the flange 17 will exclude dust from the same.

The stationary casing is provided at the center of its top with a depending tapering sleeve 24, terminating in an annular ball-race 25, receiving an annular series of antifriction-balls 26; but any other suitable antifriction devices, such as rollers or the like, may of course be employed. The depending tapering portion 11 of the rotary casing consists of an approximately truncated conical shell, from which depends a centrally-arranged tube 27, spaced from the periphery of the dependimg portion 11, at the lower end thereof, to provide a lower shoulder 28, which rests upon the antifriction-balls 26, and the ball-race, which consists of an annular trough, may be filled with a suitable lubricant.

The tube 27 depends below the ball-race 25, and it forms a support for a series of blades 29, mounted on a tapering sleeve 30, which is adjustably secured to the tube by a clamping-screw 31 and which is provided with an inner cylindrical extension 32 to fit the tube 27. The blades 29, which are arranged at an inclination, operate within the lower stationary casing and are carried by the upper rotary casing, and they are adapted to agitate the air within the lower casing and drive the same outward through a series of distributing tubes or pipes 34, extending outward from a conical section. The conical section is arranged at the bottom of and is detachably secured to the stationary casing by suitable fastening devices 35. These distributing tubes or pipes, which extend in various directions, are provided with suitable cut-offs 36 for controlling the passage of the air; but, if desired, the lower conical section or member may be removed, and the bottom of the casing may be open for discharging the air directly into the space or compartment to be ventilated. The distributing pipes or tubes may be connected with any suitable tubes or pipes for delivering the air to various parts of a building to be ventilated.

Within the rotary casing, at the inner end of the eccentrically-arranged passage 3, is mounted a vertical fan 37, consisting of a vertical shaft provided with a series of blades. The rotation of the casing will cause the fan to rotate and agitate the air in the casing, setting up a slight backward current, which will assist in directing the air downward through the depending tapered portion of the chamber; but, if desired, any suitable means may be provided for otherwise rotating the fan.

In order to avoid injury to the ventilator, a suitable relief valve or valves may be provided and may be arranged at any desired point. The relief-valve 38, which may be of any desired construction, is held closed by a spring 39, coiled around a stem 40, which is arranged within a suitable frame or bracket 41. The spring is engaged by an adjusting-nut 42, mounted in a threaded opening of the bracket or frame 41 and adapted to vary the tension of the spring and capable of enabling the relief or safety valve to be held closed until the interior pressure of the air reaches a predetermined point.

What we claim is—

1. A ventilator comprising a lower stationary casing, an upper rotary casing mounted on the lower casing and provided with a depending hollow portion extending into the lower casing, and a fan mounted on and carried by the depending portion of the rotary casing, substantially as described.

2. A ventilator comprising a lower stationary casing, an upper rotary casing communicating with and mounted on the lower casing, and a fan located within the lower casing and connected with and operated by the upper rotary casing, substantially as described.

3. A ventilator comprising a lower casing, an upper rotary casing having a depending hollow portion extending into the lower casing, a sleeve located within the lower casing and mounted on the depending hollow portion of the upper casing, and blades mounted on the sleeve, substantially as described.

4. A ventilator comprising a stationary casing, a rotary casing mounted thereon and having a depending hollow portion communicating therewith, a tapering sleeve mounted on the depending hollow portion, and inclined blades secured to the tapering sleeve, substantially as described.

5. A ventilator comprising a lower stationary casing provided at the top with a ball-race, a rotary casing arranged on the lower casing and having a depending flange receiving the same, antifriction devices arranged in the ball-race and supporting the rotary casing, and a fan located within the stationary casing and operated by the rotary casing, substantially as described.

6. A ventilator comprising a lower stationary casing having a depending tubular portion, an upper rotary casing arranged on the stationary casing, antifriction devices supporting the rotary casing, a depending tube carried by the rotary casing and extending into the stationary casing, and a fan mounted on the tube and located within the stationary casing, substantially as described.

7. A ventilator comprising a lower stationary casing provided at the top with a depending tapering sleeve having an annular trough or groove at its lower end, an annular trough or groove arranged at the top of the casing, antifriction devices located in the troughs or grooves, an upper rotary casing supported by the antifriction devices and provided with a depending tapering shell arranged within the tapering sleeve, and having a depending tube, and means for rotating the upper casing, substantially as described.

8. A ventilator comprising a lower stationary casing provided with a detachable conical section having discharge-tubes, and an upper rotary casing mounted on the lower stationary casing and provided with an eccentrically-arranged air-passage communicating with the interior of the upper casing, substantially as described.

In testimony that we claim the foregoing as our own we have hereto affixed our signatures in the presence of two witnesses.

FLORENCE CARRICO FOOS.
THOMAS G. MUIR.

Witnesses:
PHILIP E. WINTER,
ABBIE RATHBONE.